Nov. 14, 1961  HANS-JOACHIM M. FÖRSTER  3,008,559
BALL BEARING COMBINED WITH A ONE-WAY CLUTCH
Filed June 10, 1959
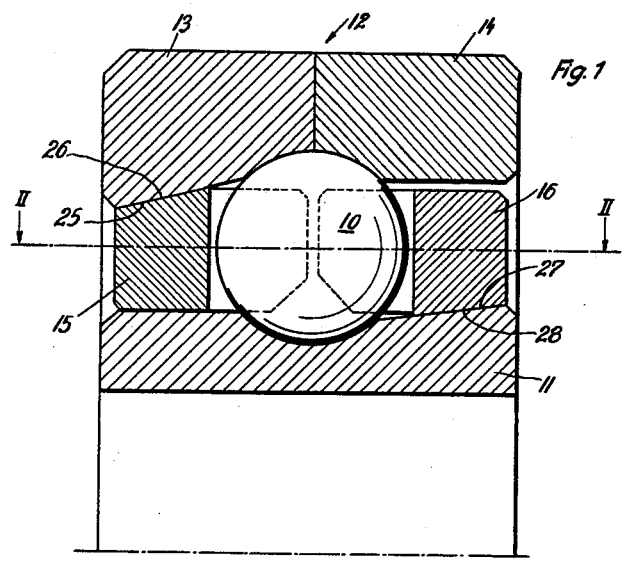
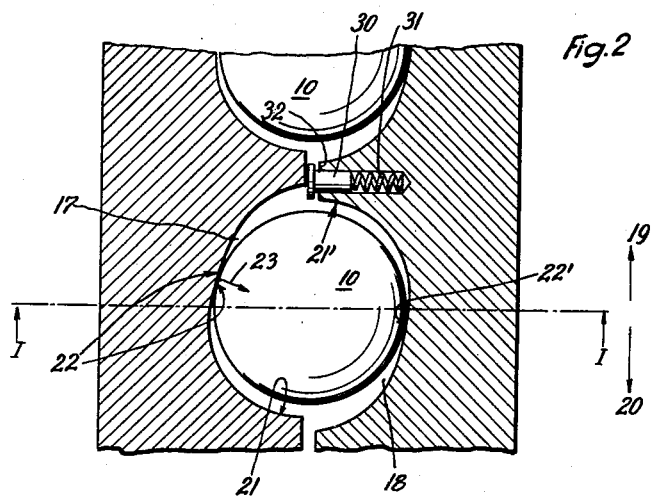
Inventor
HANS-JOACHIM M. FÖRSTER
BY
Dickie, Craig and Freudenberg
ATTORNEYS

United States Patent Office 3,008,559
Patented Nov. 14, 1961

3,008,559
BALL BEARING COMBINED WITH A
ONE-WAY CLUTCH
Hans-Joachim M. Förster, Stuttgart-Bad Cannstatt, Germany, assignor to Daimler-Benz Aktiengesellschaft, Stuttgart-Unterturkheim, Germany
Filed June 10, 1959, Ser. No. 819,330
Claims priority, application Germany June 10, 1958
12 Claims. (Cl. 192—45)

My invention relates to a ball bearing combined with a one-way clutch.

As a rule, a one-way clutch comprises one or two bearings and the clutch elements including clamping members, such as balls, rollers, blocks or the like.

It is the object of my invention to provide a novel one-way or overrunning clutch simplified by a reduction of the number of its components so as to constitute a compact unit requiring a minimum of space.

More particularly, it is an object of my invention to provide a ball bearing whose elements cooperate in a novel manner so as to afford liberty of relative rotation to the race elements thereof in one direction only, while clutching the race elements to each other in response to a tendency to relatively rotate in the opposite direction.

Further objects of my invention will appear from the detailed description of a preferred embodiment thereof following hereinafter with reference to the accompanying drawing. It is to be understood, however, that my invention is in no way limited to the details of such embodiment but is capable of numerous modifications within the scope of the appended claims and that the terms and phrases used in such detailed description have been chosen for the purpose of explaining the invention rather than that of restricting or limiting the same.

In the accompanying drawing

FIG. 1 is a partial axial section through my novel combined ball bearing and one-way clutch, such section being taken along the diametrical plane I—I shown in FIG. 2, and FIG. 2 is a development of a peripheral section taken along a cylindrical surface which is coaxial with the ball bearing and is indicated by the dash-dotted line II—II in FIG. 1.

The ball bearing one-way clutch illustrated in FIGS. 1 and 2 is essentially composed of the standard elements of any ball bearing, such elements including the bearing balls 10, an inner race 11 and an outer race 12. The outer race is split along a plane extending through the centers of the bearing balls and, therefore, is composed of sections 13 and 14 which are suitably connected to each other in a manner well known in the art, for instance by means of radial flanges not shown. Each of the spaced opposed faces of the races 11 and 12 is provided with a shallow peripheral groove having an arcuate profile and accommodating the bearing balls 10.

A cage embracing the bearing balls 10 is composed of two coaxial adjacent rings 15 and 16 which are disposed within the space between the races 11 and 12 and are relatively rotatable through a limited angle. The opposed faces of the rings 15 and 16 are provided with registering recesses 17, or 18 respectively, which cooperate to form pockets for the accommodation of the bearing balls. In the central peripheral surface indicated in FIG. 1 by the dash-dotted line II—II the recesses 17 and 18 are so profiled, as shown in FIG. 2, that the pockets formed by the registering recesses will become wider upon a relative rotation of the rings 13 and 14 in one direction indicated by the arrow 19, and become more narrow upon relative rotation of the rings 13 and 14 in the opposite direction indicated by the arrow 20. More particularly, the recess 17 forms a concave seating area 21 facing substantially in the peripheral direction of the arrow 19 for engagement by the ball 10, when the latter rolls in one direction. Moreover, the recess forms a second seating area 22 which faces substantially laterally in the direction of the arrow 23 for engagement with the ball 10, when this ball tends to roll in the opposite direction. The seating area 22 is substantially less curved than the seating area 21 and forms an acute angle with a plane normal to the axis of the ball bearing or of the rings 15 and 16. The shape of the recess 18 is identical with the shape of the recess 17 and, therefore, provides for a seating area 21' facing in the direction of the arrow 20 and for a seating area 22' facing in a direction opposite to the arrow 23. Hence, the two seating areas 22 and 22' are disposed in diagonal opposition and, similarly, the seating faces 21 and 21' are disposed opposite each other. The cage rings 15 and 16 and the races 11 and 12 are formed with clamping faces for mutual frictional engagement with each other. One pair of such opposed clamping faces is formed by an outer conical surface 25 of the ring 15 tapering outwardly and by a mating inner conical surface 26 of section 13 of the outer race 12. The other pair of opposed clamping faces is formed by an inner conical surface 27 of the ring 16 tapering inwardly and by a mating outer conical surface 28 of the inner race 11.

Resilient means are provided tending to move the rings 15 and 16 apart. In the embodiment shown such resilient means comprises a plurality of pins 30 each being slidably guided in a bore provided in the ring 16 and extending parallel to the axis thereof, such bore accommodating a helical pressure spring 31 urging the pin 30 out of the bore into contact with an opposed face 32 of the ring 15, such face 32 being normal to the axis of the bearing and having a peripheral width sufficient to insure permanent engagement with the pin 30 upon relative angular displacement of the rings 15 and 16. Owing to the pressure exerted by the spring 31, the opposed faces 25 and 26 will be held in permanent frictional engagement and, similarly, the faces 27 and 28 will be held in permanent frictional engagement, the pressure being so law, that the friction does not materially interfere with a rotation of the race 12 relative to the race 11 in the direction of the arrow 19, although the friction between the race 12 overtaking the ring 15 and the latter will suffice to produce a rotary force on the ring 15 keeping its seating areas 21 in contact with the bearing balls 10. Similarly, the friction between the faces 27 and 28 will exert a retarding rotary force upon the ring 16 sufficient to keep the seating areas 21' in contact with the bearing balls 10. Hence, the rings 15 and 16 and the bearing balls 10 will be maintained in a mutual rotary position in which the bearing balls have so much play in the pockets of the cage that they exert no spreading force upon the seating areas 22 and 22'. Hence, my novel device acts as a normal ball bearing, the balls rolling on the inner race 11 and being overtaken in the same direction by the outer race 12, while the cage composed of the rings 15 and 16 will keep the balls 10 apart.

When the outer race 12 tends to rotate in the direction of the arrow 20, however, relative to the inner race 11, they will be clutched to each other in the following manner: The ring 15 will be turned relative to the inner race 11 in the direction of arrow 20 by the friction between the opposed faces 25 and 26. The ring 16, however, will be held back by the friction between the opposed faces 27 and 28. As a result, the cage rings 15 and 16 perform a relative rotation similar to that of the races 11 and 12, whereby each ball 10 will be clamped between the inclined seating areas 22 and 22' of the opposed recesses 17 and 18. The reactionary force of this clamping effect, however, will spread the rings 15 and 16 apart with a powerful effect increasing the friction between the clamping faces 25, 26 and 27, 28 to such an extent as to block any relative rotation between race 12 and ring 15 and, similarly, blocking any relative rotation between race 11 and ring 16. Since the rings 15 and 16, however, cannot rotate relatively beyond a limited angle, they will arrest the relative rotation of the races 11 and 12. Hence, my novel ball bearing acts as a one-way clutch preventing rotation of the race 12 relative to the race 11 in the direction of the arrow 20.

While the races and the cage elements preferably consist of hardened steel in the conventional manner, one of the faces 25, 26 and one of the faces 27, 28 may be plated with a suitable metal, such as brass, to prevent binding.

While in the embodiment shown the concave surface of each recess 17 or 18 has straight radial elements, it will be readily appreciated that this is not an essential feature of my invention and that the faces of the recesses may be so shaped as to conform to the curvature of the surface of the bearing balls.

From the above it will be appreciated that all of the elements forming part of the one-way clutch, particularly the bearing and clamping elements, are combined to constitute a ball bearing. Hence, the new one-way clutch represents a regular ball bearing in its free-wheeling direction, such ball bearing being capable of taking up radial forces and axial thrusts. Preferably, the elements constituting the bearing during the free-wheeling operation, such as the races, the balls and the cage, act as the clamping means in the opposite direction. These clamping means include the two-part annular cage whose sections 15 and 16 are adapted to be spread apart by the bearing balls and to be frictionally clutched with the races. In the preferred form of my invention the cage is composed of a pair of rings mounted in adjacent and coaxial relationship. The surface of each cage ring directly embracing each ball comprises a seating area on which the ball upon engagement substantially transfers peripheral forces only and a second seating area on which the ball upon engagement exerts axial forces and peripheral forces, the axial forces being larger than the peripheral forces. Moreover, the cage elements are preferably so formed that the internal surface directly surrounding each bearing ball comprises a concave seating area guiding the ball in the free-wheeling operation and an inclined seating area subjected to pressure by the ball upon engagement in the clutching operation. The inclined seating areas are preferably so inclined to a plane normal to the axis of the bearing that a braking friction is produced between the balls and the inclined seating areas.

My novel combined free-wheeling clutch and ball bearing constitutes a unit of simple and rugged structure which is so compact as to require a minimum of space and lends itself to manufacture at low cost.

Moreover, it will be appreciated that my novel ball bearing having self-locking properties in one direction of rotation may have substantially the same dimensions as a standard ball bearing differing therefrom substantially by the conical clamping faces of the races and by the specific cage. In its free-wheeling direction my novel ball bearing acts as a regular ball bearing being capable of taking up considerable radial and axial forces. In the opposite direction my novel ball bearing acts as a regular one-way clutch capable of transferring a considerable torque between its races. Moreover, it will be appreciated that my novel free-wheeling clutch will not exert any axial forces upon the machine elements carrying the races because the reactionary forces balancing the axial components of the clamping forces exerted on the conical faces 25 and 27 will be taken up by the shoulders of the peripheral grooves of the races 11 and 12.

From the foregoing it will be seen that this invention is one well adapted to attain all of the ends and objects hereinabove set forth, together with other advantages which are obvious and which are inherent to the combination.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. A ball bearing comprising an outer race and an inner race, a cage between said outer race and said inner race so constructed and arranged as to form pockets, and bearing balls in said pockets, said cage comprising a pair of elements mounted on opposite sides of a plane extending transversely through said bearing, said pair of elements being axially and relatively movable by relative rotation of said races in one direction into a position of clamping engagement with said balls and relatively movable by relative rotation of said races in the opposite direction into a non-clamping position with respect to said balls, said pockets being so constructed and arranged as to cause said balls to exert a clamping pressure on said elements, when in said position of clamping engagement.

2. A ball bearing as claimed in claim 1 in which said relatively movable elements are a pair of adjacent coaxial rings, the opposed sides of said rings being provided with registering recesses forming said pockets for accommodation of said bearing balls, each recess having a seating area facing in said one direction for engagement by the bearing ball, when rolling in said opposite direction, and having another seating area facing laterally for engagement by the bearing ball when rolling in said one direction, said races and said rings having wedge faces establishing said frictional engagement.

3. A ball bearing as claimed in claim 2 in which the peripheral central profile of the recesses of one of said rings is identical in shape with the peripheral central profiles of the recesses of the other one of said rings.

4. A ball bearing as claimed in claim 2 in which said seating area facing in said one direction has a concave substantially circular peripheral central profile.

5. A ball bearing as claimed in claim 2 in which said seating area facing laterally extends at an acute angle to a plane normal to the axis of said rings.

6. A ball bearing as claimed in claim 2 in which said seating area facing laterally formed by a recess of one of said rings accommodating a bearing ball is disposed diagonally opposite to said seating area facing laterally formed by a recess of the other one of said rings accommodating the same bearing ball.

7. A ball bearing as claimed in claim 2 in which said wedge faces are formed by a conical face provided on the outer periphery of one of said rings tapering outwardly and by a conical face provided on the inner periphery of the other one of said rings tapering inwardly and by mating conical faces of said races.

8. A ball bearing as claimed in claim 2 further comprising resilient means disposed between said rings and tending to move the same apart.

9. A ball bearing as claimed in claim 8 in which said clamping faces are conical.

10. A ball bearing having an outer race, an inner race, bearing balls therebetween, a pair of coaxial adjacent relatively rotatable cage rings disposed on opposite sides of a radial plane extending transversely through said bearing and between said races and provided with recesses in their opposed faces for the accommodation of said balls, said recesses being so constructed and arranged that the pockets formed by registering recesses become wider upon relative rotation of said rings in one direction and become narrower upon relative rotation of said rings in the opposite direction, thereby causing said balls to spread said rings apart upon the relative rotation of said rings in said opposite direction, one of said rings and one of said races being formed with opposed clamping faces and the other one of said rings and the other one of said races being likewise formed with opposed clamping faces, said clamping faces being so constructed and arranged as to be clamped upon each other when said rings are spread apart.

11. A ball bearing consisting of an outer race and an inner race coaxially mounted, a cage between said outer race and said inner race so constructed and arranged as to form a plurality of pockets, and bearing balls in said pockets, said cage consisting of a pair of adjacent coaxial rings mounted on opposite sides of a radial plane extending transversely through said bearing, said pair of rings being axially and relatively movable by relative rotation of said races in one direction into a position of clamping engagement with said balls and relatively movable by relative rotation of said races in the opposite direction into a non-clamping position with respect to said balls, said pockets being so constructed and arranged as to cause said balls to exert a clamping pressure on said rings, when in said position of clamping engagement.

12. A ball bearing consisting of an outer race and an inner race coaxially mounted, a cage between said inner and outer races so constructed and arranged as to form a plurality of pockets, bearing balls in said pockets, said cage consisting of a pair of adjacent coaxial rings mounted on opposite sides of a radial plane extending transversely through said bearing, said pockets being formed by recesses formed in the opposed faces of said rings for accommodating said bearing balls, said pair of rings being axially and relatively movable by relative rotation of said races in one direction into a position of clamping engagement with said balls and relatively movable by relative rotation of said races in the opposite direction into a non-clamping position with respect to said balls, said recesses being so constructed and arranged as to cause said balls to exert a clamping pressure on said rings when in said position of clamping engagement, each of said recesses having a seating area facing in said one direction for engagement by the bearing balls, when rolling in said opposite direction, and having another seating area facing laterally for engagement by the bearing balls when rolling in said one direction, said races and said rings having wedge faces formed by a conical face provided on the outer periphery of one of said rings tapering outwardly and a conical face provided on the inner periphery of the other one of said rings tapering inwardly and by mating conical faces of said races for establishing said frictional engagement, and resilient means disposed between said rings and tending to move the same apart.

References Cited in the file of this patent
UNITED STATES PATENTS

| | | |
|---|---|---|
| 1,061,048 | Clemencet | May 6, 1913 |
| 1,724,983 | Weiss | Aug. 20, 1929 |
| 1,942,909 | Von Thungen | Jan. 9, 1934 |